United States Patent [19]

Jett

[11] 4,316,592
[45] Feb. 23, 1982

[54] CAMERA-TO-TRIPOD ALIGNMENT HOLDER

[76] Inventor: Earl A. Jett, 7782 W. Woodard Dr., Lakewood, Colo. 80227

[21] Appl. No.: 161,264

[22] Filed: Jun. 20, 1980

[51] Int. Cl.³ ............................................ F16M 11/04
[52] U.S. Cl. .................................... 248/187; 354/293
[58] Field of Search ............... 248/177, 178, 179, 181, 248/183, 187, 300; 354/293; 352/69

[56] References Cited

U.S. PATENT DOCUMENTS

| | | | |
|---|---|---|---|
| 1,071,642 | 8/1913 | Kintz | 248/257 |
| 2,589,892 | 3/1952 | Suzukawa | 248/187 |
| 2,602,499 | 7/1952 | Ault | 248/265 X |
| 2,689,103 | 9/1954 | Ackerman | 248/257 |
| 2,964,280 | 12/1960 | Rinaldi | 248/265 |
| 3,120,940 | 2/1964 | Faro et al. | 248/300 X |
| 3,286,212 | 11/1966 | Thompson et al. | 248/187 |
| 3,423,056 | 1/1969 | Welt | 248/187 |
| 3,563,154 | 2/1971 | Henning | 248/177 X |

FOREIGN PATENT DOCUMENTS

| | | | |
|---|---|---|---|
| 2648590 | 5/1978 | Fed. Rep. of Germany | 354/293 |
| 343938 | 10/1904 | France | 248/178 |
| 167755 | 2/1956 | Sweden | 354/293 |

Primary Examiner—J. Franklin Foss
Attorney, Agent, or Firm—Kyle W. Rost

[57] ABSTRACT

A pair of parallel sliding planar members are each associated with a lip, the lips extending normally from the planes of the members and in opposite outward directions. The planar members are held together for sliding movement along a single axis normal to the longitudinal direction of the lips. A plurality of apertures are formed through the planar members and defined by elongated slots in each planar member. In use, one lip engages the edge of a tripod platform and the other lip engages an edge of a camera body, while the tripod mounting screw from the tripod head passes through one of the apertures and is engaged in a mounting socket in the camera body.

4 Claims, 4 Drawing Figures

CAMERA-TO-TRIPOD ALIGNMENT HOLDER

BACKGROUND OF THE INVENTION

1. Field of the Invention

The invention relates generally to supports and more specifically to stands, especially to article support stands and heads with article attaching means. This invention also specifically relates to brackets adaptable to use on tilting heads of stands.

2. Description of the Prior Art

In the photographic arts cameras are frequently mounted on stands such as tripods. A typical tripod head includes a platform and a mounting screw carried in the platform for engagement in the tripod mounting socket provided as a standard feature of most camera bodies. The platform is usually intended to be supported in a horizontal position but may have provision to be tiled along a hinged edge so that the camera is supported in sideways position.

A problem encountered with the use of such a standard camera tripod is that the camera's center of gravity is not always in axial alignment with the mounting screw. Especially when the camera is in sideways position on the tripod, and instability is created and the camera has a tendency to pivot on the mounting screw in a gravity induced tendency to assume the most stable position wherein the center of gravity is directly below the point of suspension. The magnitude of the problem is dependent upon how far from the tripod socket is the center gravity and upon the weight of the camera. A light camera may be stabilized by merely tightening the mounting screw, while a heavy camera requires a more nearly centered mounting socket.

A special problem is created when heavy lenses or flash attachments are used with any camera, since the center of gravity is then shifted regardless of how well balanced the camera was originally designed. This problem has been recognized in U.S. Pat. No. 2,589,892 to Suzukawa, disclosing a camera holder fitting between the camera body and the tripod and offering a selection of substitute tripod mounting sockets in a variety of locations. The Suzukawa solution was thus to anticipate a variety of possible centers of gravity and to provide correspondingly aligned mounting points to the tripod, while the special holder held the camera in a box-like casing. The quality of this solution was directly dependent upon the accuracy with which various actual centers of gravity could be anticipated.

Special purpose mountings for cameras are known, many of which eliminate all possibility of accidental shifts in camera position. However, these require specially designed cameras and camera stands and do not offer any solution to the problem as presented to persons dealing with commercially popular tripods and camera bodies, which are quite standard in mounting apparatus.

SUMMARY OF THE INVENTION

An alignment holding device for use between a tripod of the type having a planar head carrying a mounting screw normal thereto and a camera body of the type having a tripod mounting socket therein is constructed from planar sheet material having a rib on the opposite faces thereof, one rib for engaging an edge of the tripod head and the other rib for engaging an edge of the camera body, thereby preventing the camera body from twisting on the mounting screw axis with respect to the tripod head, regardless of whether the center of gravity of the camera is in alignment with the mounting screw axis. The alignment holder is provided with at least one aperture through its planar body for permitting passage of the tripod mounting screw, and this aperture may be elongated along the axis normal to one or both lips for permitting the alignment holder to assume a variety of positions relative to the tripod head and camera body. In order to fit on a variety of tripod heads and camera bodies, the holder is adapted to be length adjusted along the axis normal to the ribs; and for this purpose the planar body may be formed from two planar sheets in overlapping relationship, each of said sheets being associated with one rib. The sheets may be held together in sliding relationship along a single axis by a pair of opposed channels formed at opposite edges of one sheet for receiving the corresponding edges of the other sheet therein. Each sheet may have elongated overlapping slots positioned to form at least one continuous aperture through both sheets at any position of sliding relationship permitted by the channels, and a plurality of laterally parallel, longitudinally elongated slots may create a like plurality of apertures for permitting the alignment device to assume both laterally and longitudinally selected positions with respect to the tripod head and camera body. The ribs also serve as means to limit available separation of the two body members, as the ribs strike the ends of the channel members to define terminal positions of available movement between the two body members. Each body member is preferred to be formed from a single piece of sheet material, and the associated rib is an edge portion of the sheet material bent to a substantially perpendicular position. Likewise, the channel members may be formed from tabs at the side edges of one of the body members, bent to define a channel structure in combination with the planar portion of the body member.

The main object of the invention is to create an alignment holder that is widely adaptable for use between standard tripod and camera to hold the camera against unwanted rotation on the tripod mounting screw, as when the camera has a center of gravity substantially offset from the axis of the mounting screw, and the screw is in horizontal position. The alignment holder provides a pair of locking surfaces, one engaging the camera body and one engaging the tripod head, and these locking surfaces are themselves prevented from mutually rotating, with the result that the camera is prevented from rotating with respect to the tripod head.

DESCRIPTION OF THE PREFERRED EMBODIMENT

Figure 1:
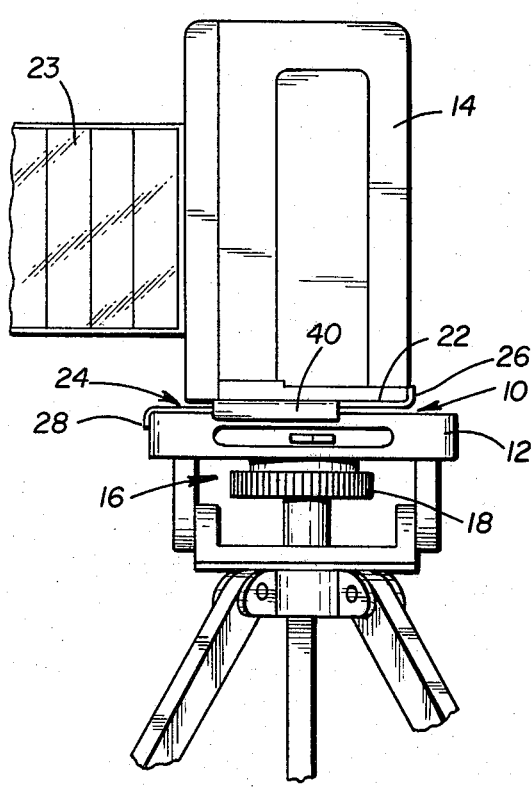
FIG. 1 is a side elevational view of a camera body, tripod head, and alignment holding device in operating relationship.

The alignment holder 10 is best shown in operative position in FIG. 1, wherein it is mounted between a tripod platform 12 and a camera body 14, the latter two items being typical of tripods and cameras of standard configuration. The tripod platform is planar and is normally supported in horizontal position as shown, but many such platforms are capable of tilting movement into a vertical plane as well. A mounting screw 16 is carried in the platform and controlled by twisting a knurled head 18 located below the platform and attached to one end of the screw. The screw shank then extends through a bore in the platform, and a threaded end 20 protrudes above the plane of the platform for engagement with a camera or other object having a threaded socket sized for engagement with the screw threads. The bore through the platform loosely fits the screw shank so that the screw can freely rotate therein, and the threaded end is then of slightly wider diameter than the bore so that the screw is retained against loss from the platform.

The camera body 14 is representative of any type of equipment adapted to be mounted on a tripod of the type described, such equipment including still cameras, motion picture cameras, photographic lights and flash units, and lenses, by way of example. Any such equipment may be provided with a mounting socket adapted to engage a tripod screw 16. Usually the socket will be in a planar wall of the equipment, such as in the bottom wall 22 of the camera body 14. The planar bottom wall therefore is pressed against the planar platform 12 by the pressure exerted by the screw. Substantial friction may result in the common plane between the platform and camera body, often permitting the platform to be placed in vertical position without loss of alignment between the platform and camera body, despite nonalignment between the longitudinal axis of screw 16 and the center of gravity of the camera body. However, a heavy attachment to the camera, such as a telephoto lens 23, can sufficiently move the center of gravity so that the torque exerted on the screw axis is able to overcome the friction in the common plane, resulting in loss of alignment as the center of gravity pivots on the screw axis to a position of greater relative stability and less exertion of torque.

The alignment holder 10 includes a planar body 24 having opposite faces each associated with a rib, which for convenience of reference may be referred to as upper rib 26 and lower rib 28, although the direction of the ribs is interchangeable. One rib, such as upper rib 26, is adapted to engage an edge of the camera body; and the other rib, such as rib 28, is adapted to engage an edge of the platform 12. The edges engaged may be parallel or at any angle to each other, and they may be on the same or opposite ends of the planar body 24. In FIG. 1, the engaged edges are shown to be parallel and on opposite ends of the body 24, with the result that the ribs 26 and 28 are parallel and offset on opposite ends of the planar body, rib 24 being at the front edge of the body and rib 26 being at the rear edge.

Figure 2:
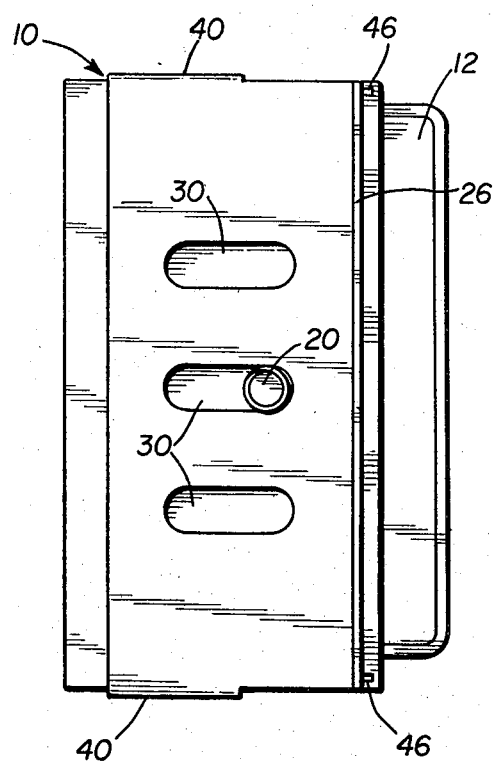
FIG. 2 is a top plan view of the alignment holding device on a tripod head, showing the mounting arrangement.

The alignment holder is provided with an aperture 30 normal to the planar body and sized to receive the threaded end 20 of the mounting screw freely therethrough. One or more such apertures may be employed, with the preferred construction including three apertures 30, one transversely centered and one spaced laterally to each side of the center aperture, as shown in FIG. 2. The choice of three such apertures 30 permits the tripod mounting screw to be inserted through any one slot according to the needs of a specific tripod platform and camera body for best security and engagement. The apertures may be elongated on a longitudinal axis extending between the front and rear edges of the alignment holder so that the relative positions of these edges may be adjusted with respect to the mounting screw position.

Figure 3:
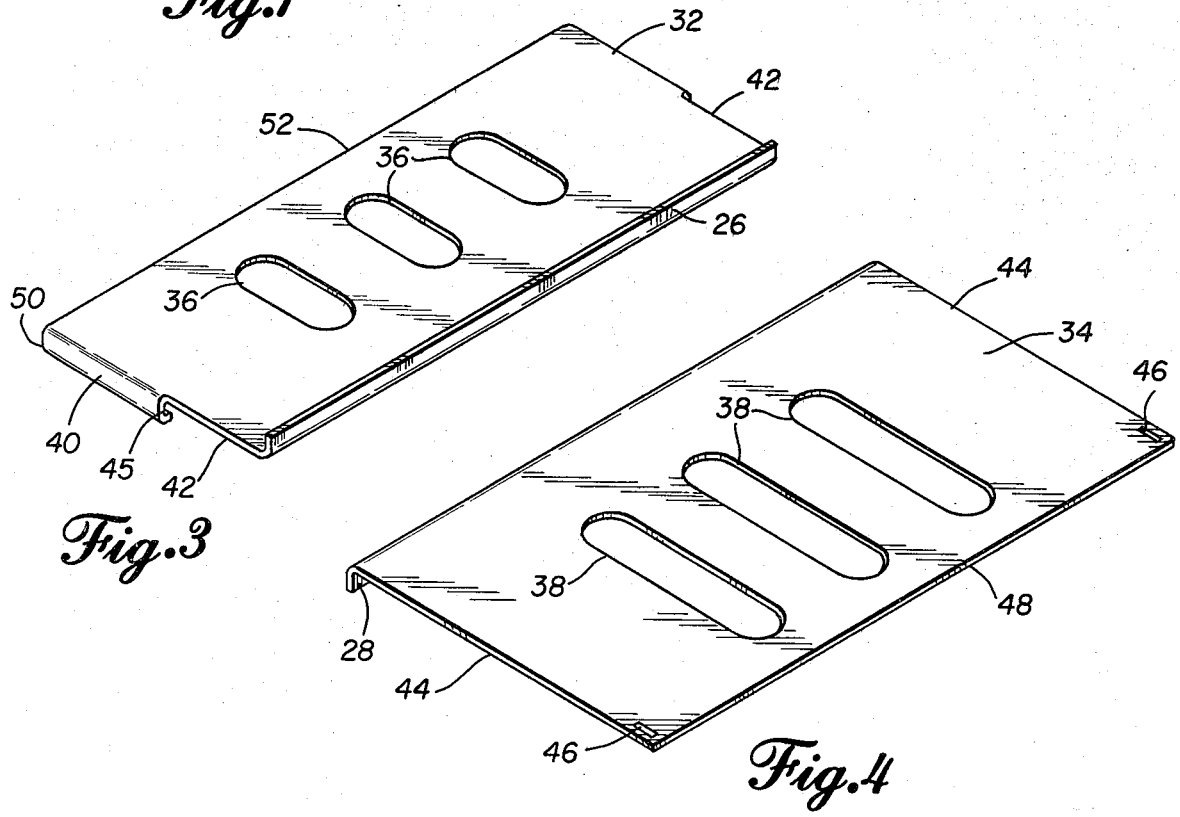
FIG. 3 is an isometric view of the top plate of the alignment holder.
Figure 4:
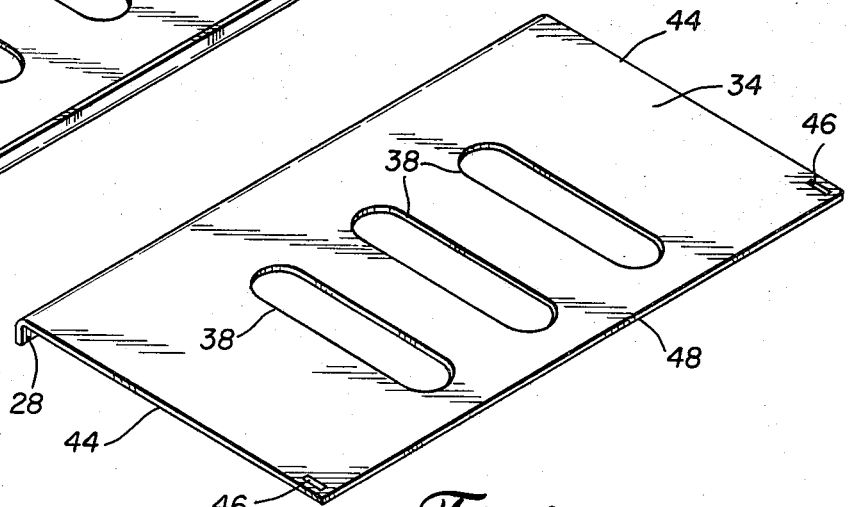
FIG. 4 is an isometric view of the bottom plate of the alignment holder.

The upper and lower ribs 26 and 28 are adjustable in their relative positions to the aperture 30 and to each other. As best shown in FIGS. 3 and 4, the body portion 24 of the alignment holder is formed from a pair of plates including top plate 32 and bottom plate 34. Each plate defines at least one opening, for example an elongated slot 36 in plate 32 or elongated slot 38 in plate 34, which openings define the aperture 30 when they are in overlapping position. The two plates are substantially planar and are adapted to slide longitudinally with respect to each other, thereby moving the rib associated with each plate with respect to the other rib. The elongation of slots 36 and 38 permits the aperture 30 to in turn have a variably elongated configuration, permitting latitude in the exact point of the aperture where the mounting screw 16 will be inserted. Therefore, the relative movement of the plates 32 and 34 also may move the ribs with respect to the aperture.

Plates 32 and 34 are permitted to move relative to each other along at least one axis, such as the longitudinal front-to-rear axis between the ribs 26 and 28, located as shown in FIGS. 1 and 2. However, means are provided to prevent the plates from rotating relative to each other about the aperture 30, so that the plates can cooperatively resist rotational forces exerted by an offset center of gravity in the camera. Such means may include any directionally specific structure such as mating longitudinal ribs and grooves on the facing surface of the plates. The preferred means both limits relative movement between the plates to a single axis and fastens the plates together in parallel abutting planes. Channels 40, depending from the side edges 42 of plate 32, perform both specified functions by engaging the side edges 44 of the bottom plate in the mutually facing openings of the two opposed channels. The longitudinal dimension of each channel is less than the full length of the top plate so that the plates have an increased range of permitted movement, such movement being limited in one direction when the end 45 of channels 40 strike rib 28. The lower plate may have retaining means such as bosses 46 formed at the end edge 48 opposite from rib 28 and positioned to contact the opposite end 50 of channels 40 to thereby limit movement of the plates in the opposite direction. In FIG. 4, the bosses are illustrated to be in negative relief on the top of bottom plate 34, as might be formed by a punching operation producing like shapes in positive relief on the bottom of the plate.

The alignment holder 10 may be formed from two pieces of maleable sheet material such as aluminum. The rib associated with each plate my be formed by bending an end edge of each sheet to form a lip, and the channels 40 may be formed by bending under a pair of tabs at the side edges 42 of the sheet being formed into the top plate. The preferred size of the finished product is four inches wide. The bottom plate 34 is 2 ¼ inches in length with a depending 150 inch lip 28. The top plate is substantially shorter in length, such as 1⅝ inches, and has an upstanding 150 inch lip. Slots 36 and 38 are identically laterally spaced in each plate with the center line of the side slots being 1 3/16 inches from the closest side edge and the center slot being at the midline of the width. Each slot has a width of 9/32 inches. Slots 36 in the relatively shorter top plate are ≃ inches in length and longitudinally centered in the plane of the top plate. Slots 38 in the relatively longer bottom plate are almost twice as long as slots 36 and may be identical in length to the top plate, or 1⅜ inches. These slots are spaced longitudinally approximately 7/16 inches from lip 28 and 3/16 inches from end edge 48. Channels 40 on the top plate may have one end 50 flush with end edge 52 opposite from lip 26, and the other channel end 45 may be ¾ inch from lip 26. The retaining bosses 46 may have their ends closest to lip 28 spaced approximately 1/5 inch from edge 48.

From the sample dimensions above, it is clear that the top plate has a range of movement over the bottom plate permitting each longitudinal end of slots 36 to be moved flush with or slightly beyond the corresponding longitudinal ends of slots 38, maximizing the range of available longitudinal movement while maintaining the longitudinally elongated nature of the residual aperture 30 for flexibility in locating the mounting screw 16.

In operation, the alignment holder is placed over the tripod platform 12 with lip 28 engaging the straight forward edge of the platform, the forward edge being any edge of the platform toward which the front of the camera will face. The holder is laterally aligned on the platform so that one of the apertures 30 receives the upwardly extending mounting screw 16. The camera body is then placed over the alignment holder as the lip 26 is adjusted to engage the rear edge of the camera body, the rear edge being opposite from the lens. Lips 26 and 28 may then be pinched toward each other for snug engagement of the tripod and camera as the mounting screw is tightened, locking the alignment hodler 10 in the designated position. Subsequently, the tripod platform may be tilted as desired.

The designation of forward and rearward ends of the alignment holder should be understood to be for purposes of illustration, as are designations of upper and lower ribs or lips. The forward lip is preferred to engage the tripod platform rather than the camera for convenience of touching this lip without interfering with the camera lens. Also, both lips may be at the same relative end of the two plates rather than at opposite ends as described, the latter arrangement being preferred for ease in pinching the lips together for a snug fit. Accordingly, the scope of the invention is to be limited only by the following claims.

I claim:

1. A device for maintaining selected alignment between a camera and a planar tripod platform wherein the camera is of the type having a tripod mounting socket and the tripod platform is of the type carrying a mounting screw engageable in the camera tripod socket, comprising:

a planar body defining a plurality of longitudinally elongated apertures adapted to receive a tripod mounting screw therethrough, wherein said apertures are transversely juxtaposed and mutually substantially parallel;

said planar body including at least two overlapping plates in parallel planes, each of said plates defining a plurality of longitudinally elongated slots therein, wherein said slots of each plate are adapted to overlap slots of the other plate and thereby define said apertures;

a substantially linear rib connected to a first of said two plates and protruding in relief from a first face of said planar body; and a substantially linear rib connected to the second of said two plates and protruding in relief from a second face of said planar body opposite from the first face thereof, one of said ribs being for engagement with an edge of the tripod platform and the other rib being for engagement with an edge of the camera wherein the longitudinal dimension of said apertures is parallel to the longitudinal dimension of said elongated slots; and wherein said planar body further comprises means for permitting relative sliding motions between said overlapping plates only along the longitudinal axis of the apertures, said plates having substantially equal transverse dimension and unequal longitudinal dimension, said slots in the longitudinally longer plate being of greater longitudinal dimension than the slots in the longitudinally shorter plate.

2. The device of claim 1, further comprising retaining means for preventing relative sliding movement of said plates beyond a predetermined point.

3. The device of claim 1, wherein said substantially linear ribs on said first and second plates are mutually parallel and normal to the longitudinal axis of said slots.

4. The device of claim 3, wherein said planar body is approximately four inches wide; said longitudinally longer plate is about two and one-quarter inches in length; said longitudinally shorter plate is approximately one and five-eighths inches in length; said linear rib are approximately one-eighth inch in height; each of said slots is approximately nine-thirty seconds inches wide, the longer slots being approximately twice the length of the shorter slots and the shorter slots being approximately seven-eighths inches in length, thereby permitting the shorter plate to have a range of longitudinal movement with respect to the longer plate for adapting the size of the device to selected camera and tripod platform sizes while maintaining the longitudinal configuration of said apertures for flexibility in locating the mounting screw through a selected one of said apertures.

* * * * *